Paddack & Hollar.
Grain Drill.

N° 89,333.          Patented Apr. 27, 1869.

Witnesses:
S. T. Estell
Isaac Stephens

Inventors:
Caswell Hollar
Henry Paddack
Artemas Roberts
Atty

HENRY PADDACK AND CASWELL HOLLAR, OF ABINGTON, INDIANA.

Letters Patent No. 89,333, dated April 27, 1869.

IMPROVEMENT IN GRAIN-DRILLS.

The Schedule referred to in these Letters Patent and making part of the same.

*To all whom it may concern:*

Be it known that we, HENRY PADDACK and CASWELL HOLLAR, of Abington, in the county of Wayne, and State of Indiana, have invented certain new and useful Improvements in Grain-Drills; and we do hereby declare that the following is a full and exact description thereof, reference being had to the accompanying drawings, making a part of this specification, in which—

To enable others skilled in the art to make and use our invention, we will proceed to describe its construction and operation.

Upon the horizontal timbers A A' are secured metal boxes, for the axle of the driving-wheel B.

The motion of the wheel B is communicated, by means of a bevelled gear, to the shaft R.

Figure 1:
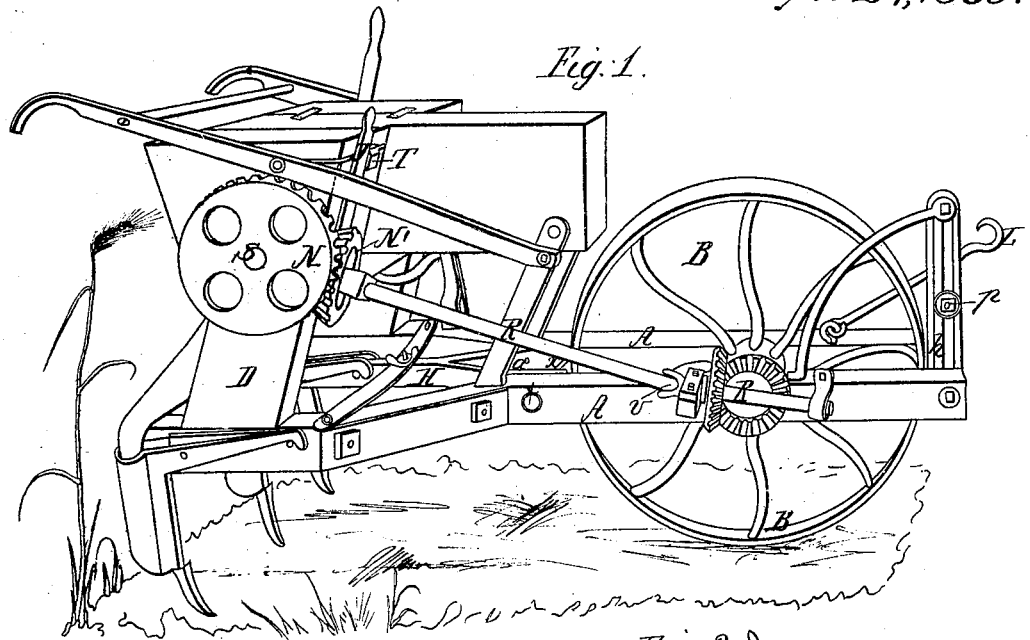
Figure 1 is a perspective view of our improved drill.
Figure 3:
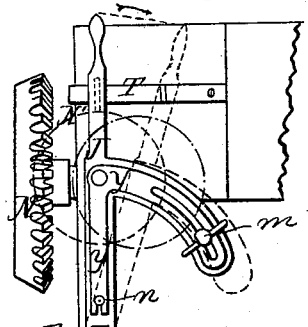
Figure 3 represents the devices for adjusting the feed, and also for throwing the machine in gear or out of gear.
Figure 2:
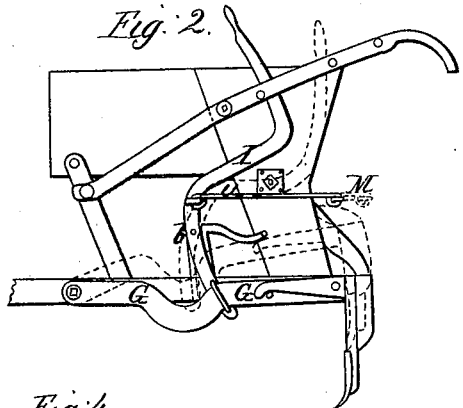
Figure 2 is a partial side elevation, showing the devices for raising one of the shovels, and at the same time shutting off the grain from the tube leading to it.
Figure 5:
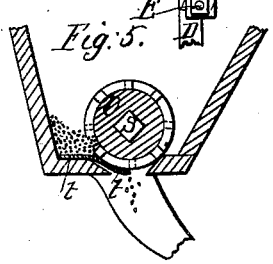
Figure 5 is a vertical section of the same.
Figure 4:
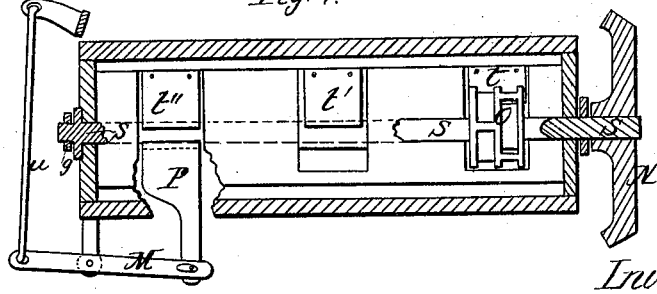
Figure 4 is a horizontal section through the grain-box.

This shaft is provided with a knuckle-joint, V, the rear end of the shaft being elevated and resting in a suitable box in the metal plate Y, fig. 3.

Motion from the shaft R is further communicated to the rod S by means of another bevelled gear, consisting of the wheels N N'.

The rod S is square in section, and upon it are placed three feed-wheels, as represented at O.

The rod S is secured in position by means of the nut $g$, the wheels O being placed loosely upon it, and kept in place by the depressions in the grain-box, in which they work.

By this arrangement the whole may be easily removed or replaced.

The feed-wheels O are provided with buckets for the reception of the grain, the partitions between the buckets being arranged alternately upon the periphery of the wheels.

There are further provided steel springs $t$ $t'$ $t''$, that impinge upon the wheels O, and prevent the grain from escaping until it has reached the lowest point in the revolution of the wheel, thus preventing the grain from passing suddenly out of the box by the force of gravity, and securing a regular and continuous feed.

The shovels and grain-conductors are made in the usual manner, wooden breakage-pins being provided, as is customary.

By removing the pin X, the bar H, to which the central shovel is attached, may be moved forward, and the pin again inserted through the hole $a$.

By this means, the shovels are arranged in a triangle with the central one at the vertex.

This arrangement is more convenient where there is much obstruction from weeds, corn-stalks, &c.; but usually it is desirable to have the shovels in a line.

The shovel on the left of the machine is attached to a curved bar, G, that is pivoted at its forward end, and may be raised or lowered by means of the lever I.

This lever is pivoted at $b$, and is provided at its lower end with a staple, through which the bar G passes, the bar being raised or lowered by forcing the staple over the curve.

At the same time that the bar G is raised, by moving the lever I, the slide P is pushed in and the opening in the grain-box closed.

This is effected by means of the connecting-rod U and pivoted lever-bar M.

The object of raising the shovel and cutting off the feed from the same, is to provide for planting a narrow strip of ground, for which the three drill-rows would be more than sufficient.

The metal plate Y, which carries the journal of the shaft K, is attached to the lever J by a bolt, $n$, and bolt with thumb-screw $m$.

The latter is secured in an extension of the lever J, and works in a slot in the plate Y.

By means of this arrangement, the shaft K may be set at the required distance from the gear-wheel N, allowing wheels N' of various diameters to be used, thus regulating the quantity of grain sown.

The lever J is pivoted at E to the wooden upright D, and is designed to operate in throwing the machine in gear or out of gear, the upper part of the lever engaging with a projection on the bar T, which holds it in proper position.

The hook L, to which the single-tree is attached, passes through an eye in the bolt $p$, which latter works in the slotted upright Q, and is secured in position by tightening the tap.

Having thus fully described our said invention,

What we claim, and desire to secure by Letters Patent, is—

1. The combination of the plate Y, shaft R, and lever J, operating together, substantially in the manner and for the purpose described.

2. The curved bar G and lever I, operating together to raise the shovel, substantially as described.

3. In combination with the lever I, connecting-rod U, and lever-bar M, the slide P, for shutting off the grain, substantially as described.

4. The combination and arrangement of the timbers A A, pin X, and movable bar H, for changing the position of the shovels, substantially as described.

HENRY PADDACK.
CASWELL HOLLAR.

Witnesses:
SAM. F. ESTELL,
ISAAC STEPHENS.